Figure 1:
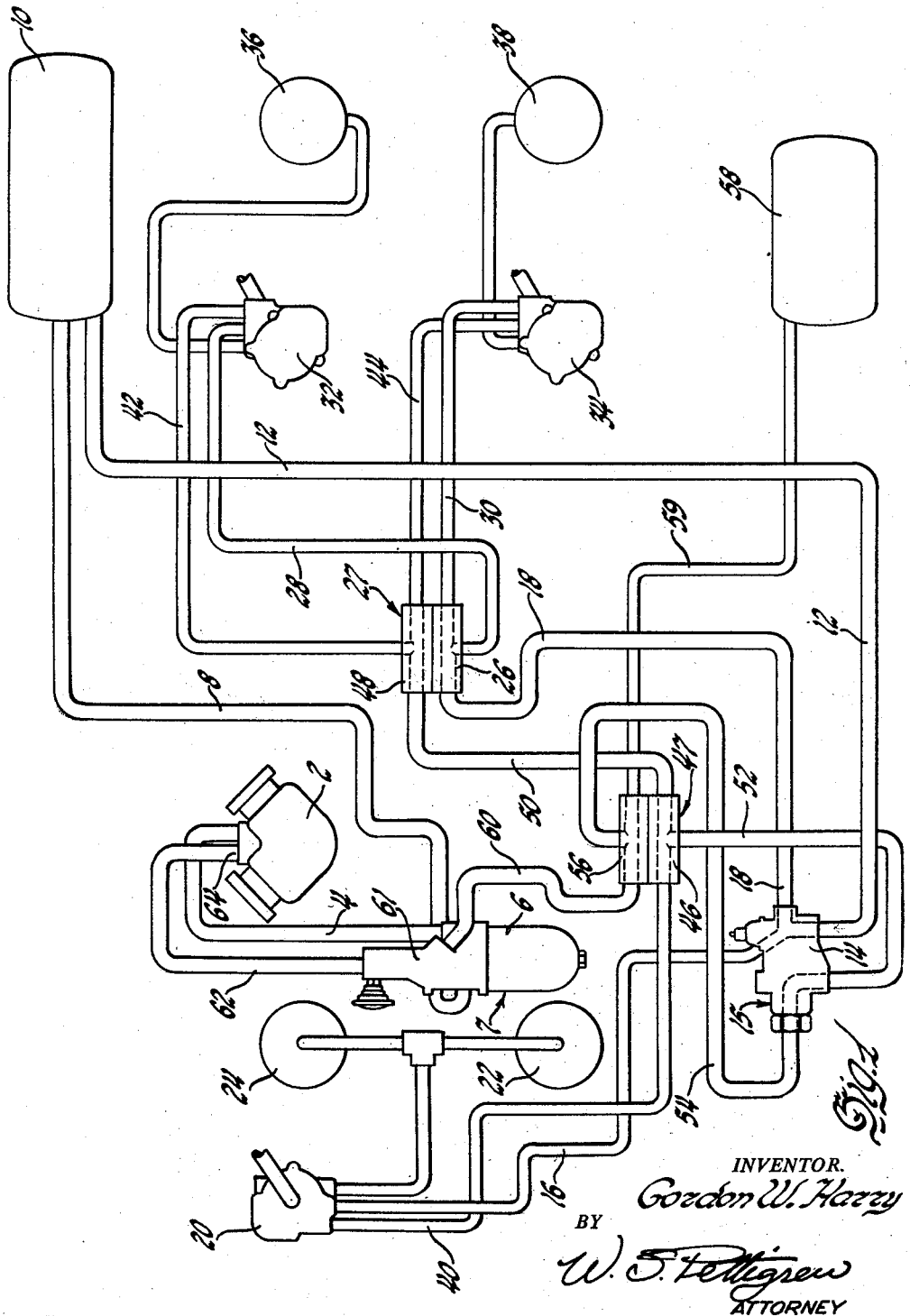

United States Patent Office
2,912,254
Patented Nov. 10, 1959

2,912,254

AIR SUSPENSION SYSTEM WITH AUTOMATIC LOW PRESSURE CIRCUIT CUTOFF

Gordon W. Harry, Flushing, Mich., assignor to General Motors Corporation, Detroit, Mich., a corporation of Delaware Application September 30, 1957, Serial No. 687,121

8 Claims. (Cl. 280—124)

This invention relates to pneumatic vehicle suspension and more particularly to fluid distribution systems and control apparatus therefor.

In the prior art, fluid distribution systems for a pneumatic vehicle suspension are divided roughly into two general forms, namely, "open" systems and "closed" systems. In the former, air supplied under pressure from a suitable source is conducted to flow regulating devices or leveling valves for the individual air springs. The leveling valves admit or exhaust air from the springs in accordance with variation in vertical clearance of the sprung mass. However, when such variation requires exhausting of air from the springs, the air is discharged directly to atmosphere. In consequence, the system is required to make-up from atmosphere all air dissipated by the leveling valve during normal vehicle operation. In the so-called closed system, the initial charge of air in the system is either wholly or for the most part returned to the source of pressure generation for recirculation. Since the frequency and magnitude of air discharge may vary greatly during certain phases of vehicle operation, closed systems may utilize low pressure reservoirs to store air which is temporarily in excess of the induction capabilities of the pressure generating source. While closed systems of the type described substantially reduce intake of air from atmosphere and attendant increase of dust and water contamination which result therefrom, in practice, the theoretical advantage of such systems is largely lost due to progressive dissipation of air stored in the low pressure tank when the vehicle is inoperative for prolonged periods. In such cases, air contained in the low pressure tank gradually leaks to atmosphere through the compressor. As a result, upon resumption of operation of the vehicle, all air lost in this manner has to be made up from atmosphere. Since such losses may ultimately deplete the entire system charge, replenishment necessarily will involve taking on an entirely new charge of air from atmosphere and thus destroy the principal advantage theoretically present in a closed system.

An object of the invention is to provide an improved pneumatic suspension system.

Another object is to provide a pneumatic suspension system including means for effecting separation of liquid contaminants from the air medium.

Still another object is to provide a combined air-oil separating device and automatic low pressure cut-off mechanism.

A further object is to provide, in a pneumatic suspension system of the type employing a low pressure air storage tank, apparatus which is automatically operable responsive to cessation of vehicle operation to prevent movement of air from the low pressure tank.

Yet a further object is to provide in a system of the type described a normally open pressure differential valve mechanism which is automatically moved to and maintained in closed position responsive to operation of the pressure generating source.

Figure 2:
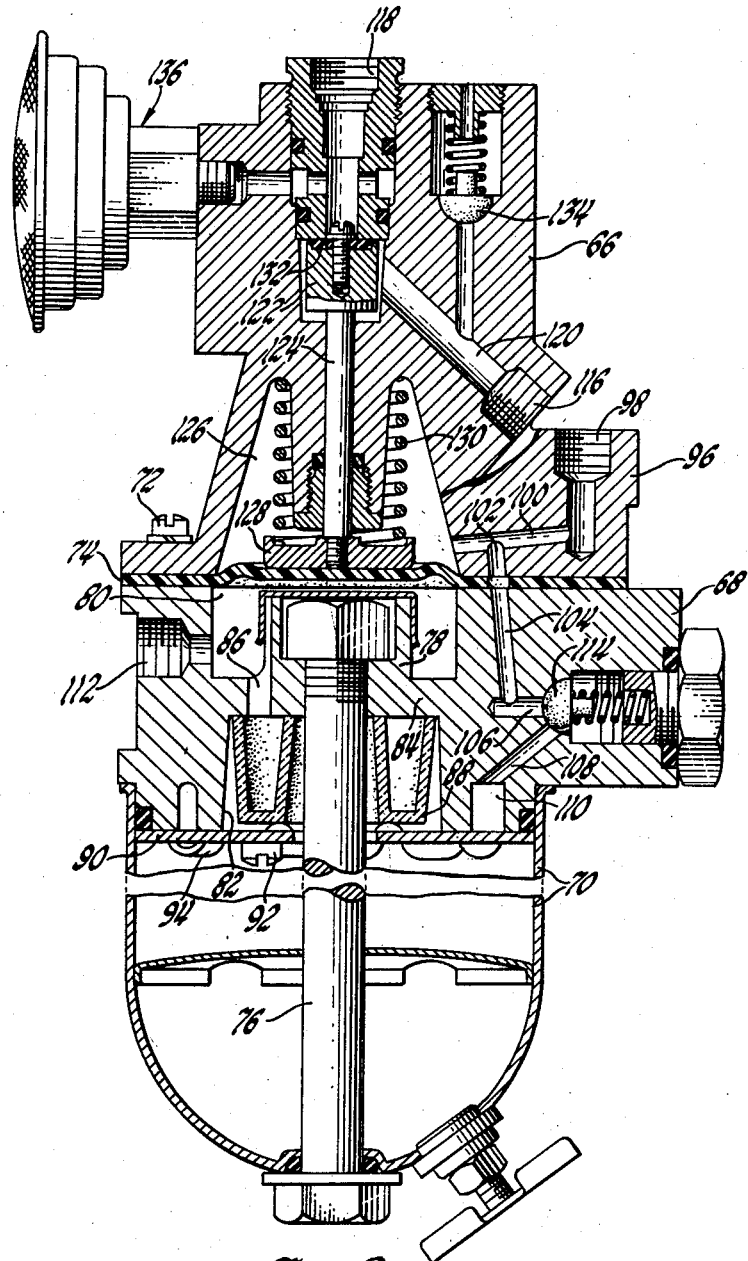

These and other objects, advantages and features of the invention will become more fully apparent as reference is had to the accompanying specification and drawings wherein:

Fig. 1 is a schematic illustration of an air suspension system incorporating the invention; and Fig. 2 is an enlarged sectional elevational view showing the form and arrangement of the invention.

Referring now to the drawings and particularly to Fig. 1, there is illustrated a semi-closed pneumatic suspension fluid distribution system wherein high pressure air generated by a compressor 2 is directed through high pressure conduit 4 to the contaminant separating section 6 of a junction device 7. After passing through separator 6, high pressure air enters a conduit 8 and is conducted to a high pressure storage tank 10. From tank 10, high pressure air is directed through conduit 12 to the pressure regulating section 14 of a section junction device 15 and emerges therefrom into high pressure conduits 16 and 18. Conduit 16 communicates with a height sensing leveling valve assembly 20 which operates responsively to changes in vehicle trim height to introduce and exhaust air from both of the front vehicle springs 22 and 24. Conduit 18, in turn, conducts high pressure air to the high pressure section 26 of a combined high and low pressure junction block 27. From junction 27, air is directed through conduits 28 and 30 to rear leveling valve assemblies 32 and 34, respectively. Leveling valves 32 and 34 operate independently to regulate the intake and exhaust of air from rear springs 36 and 38, respectively. Air exhausted from springs 22, 24, 36 and 38 is received by exhaust conduits 40, 42 and 44, respectively. Conduit 40 returns air to section 46 of dual low pressure junction 47, while conduits 42 and 44 return air to the low pressure section 48 of gauged junction 27. Junctions 46 and 48 are connected by a low pressure conduit 50. From junction 46, low pressure air passes through conduits 52 and 54 to section 56 of dual low pressure junction 47. From junction 56, low pressure air may pass either to low pressure tank 58 through conduit 59 or to low pressure return line 60. Line 60 enters an automatic cut-off device 61, the operation of which will shortly be described, associated with separator section 6 and emerges into line 62 for return to the intake side 64 of the compressor for repetition of the cycle.

In order to realize the heretofore theoretical advantage of reduced requirement for atmosphere and the full advantage of superatmospheric intake pressure, the automatic cut-off operates to completely block off movement of low pressure air to the inlet side of the compressor whenever the latter is not in operation.

As seen best in Fig. 2, the combination separator and low pressure cut-off device includes an upper body portion 66, an intermediate body portion 68 and a separator bowl portion 70. Upper portion 66 and intermediate portion 68 are connected in abutting relation by means of a plurality of machine screws 72 and have interposed therebetween a generally circular flexible diaphragm 74. Bowl 70, in turn, is secured to the bottom of intermediate body portion 68 by means of a draw bolt assembly 76, the upper end of which is secured in a circular boss portion 78 formed centrally in portion 68. Surrounding boss portion 78 is an annular cavity 80 which is spaced above and separated from a lower circular cavity 82 by means of web portion 84. Communication between cavities 80 and 82 is accomplished by means of a plurality of circumferentially spaced drilled passages 86. Disposed in cavity 82 is a porous filter 88 which is retained therein by a swirl plate 90 secured to the base of body 68 by machine screws 92. Plate 90 is provided with a series of circumferentially spaced depressed lance portions 94, the purpose of which will be described shortly. Extending downwardly through the base portion 96 of upper body 66 is a high pressure intake port 98 which is adapted for connection with conduit 4. High pressure air is directed from port 98 to the interior of bowl 70 through the path defined by drilled passages 100, 102, 104, 106 and 108. Air emerges from passage 108 and is discharged into annular passage 110 and ejected in a swirling pattern through depressed lanced portions 94, thus causing centrifugal separation of suspended particles of water and oil, which collect in the bottom of bowl 70. From bowl 70, the clean high pressure air is forced upwardly through filter 88, passages 86 and into annular cavity 80 from whence it is discharged through high pressure outlet port 112 and into high pressure conduit 8 connected thereto. Interposed between drilled passages 106 and 108 is a check valve 114 which is spring biased in a direction preventing return flow of air from bowl 70 back through conduit 4 to the compressor outlet.

In order to automatically block movement of air to the inlet side 64 of compressor 2, upper body portion 66 of the device is provided with an inclined exhaust inlet port 116 which is connected to return conduit 60, and a vertically directed low pressure outlet port 118 which is connected to return conduit 62. Communication between ports 116 and 118 is provided by diagonal passage 120. Interposed between passage 120 and outlet port 118 is a reciprocable valve member 122 which is actuated by a stem 124 extending downwardly into frustoconical cavity 126 in body portion 66. At its lower end, stem 124 has secured thereon a circular foot 128 which is biased downwardly against diaphragm 74 by a coil spring 130. At this point, it should be noted that high pressure inlet port 98 also communicates with the cavity 126 located on the upper side of diaphragm 74. Accordingly, whenever compressor 2 is operating, the pressure in cavity 126 and cavity 80 will necessarily be equal and the position of valve 122 will be dictated entirely by the biasing action of spring 130. Therefore, during vehicle operation valve 122 will be displaced downwardly from the valve seat 132 of intake port 118 and permit flow of air from conduit 60 to conduit 62. However, as soon as compressor operation ceases, the pressure in cavity 126 will gradually diminish due to leakage back through conduit 4 to the compressor. The pressure on the lower side of the diaphragm in cavity 80, however, will remain undiminished since leakage back through port 98 is prevented by check valve 114. Consequently, the pressure differential at opposite sides of diaphragm 74 will shortly overcome spring 130 and urge valve 122 upwardly into engagement with valve seat 132, which thereafter prevents movement of exhaust air to the compressor inlet. As a result, the volume and pressure of air in the exhaust conduits and low pressure tank will remain intact for an indefinite period of time. Conversely, as soon as vehicle operation resumes, high pressure air again enters port 98 and will quickly equalize the pressure on opposite sides of diaphragm 74 allowing spring 130 to open valve 122 and permit return of normal operation of the air distribution system.

In order to accommodate transient excessive exhaust pressure, the devices includes a relief valve 134 which permits exhaust of air from the low pressure circuit to atmosphere whenever the exhaust pressure exceeds a predetermined value, as for example 70 to 75 p.s.i. Conversely, there is provided an atmosphere intake assembly 136 through which air may be drawn from atmosphere to make up air losses occurring through blow-off of relief valve 134.

While but one embodiment of the invention has been shown and described, it will be apparent that other changes and modifications may be made therein. Therefore, it is to be understood that it is not intended to limit the invention to the embodiment shown, but only by the scope of the claims which follow.

What is claimed is:

1. A control device for an air suspension system, said device comprising a body having a high pressure circuit including inlet means communicating with pressure generating means and outlet means communicating with high pressure storage means, a low pressure circuit including inlet and outlet means, a cavity in said body communicating with said high pressure circuit, a diaphragm partitioning said cavity, a reciprocable valve adapted to control flow of air from said low pressure inlet to said low pressure outlet, said valve being spring urged to open position when the pressure on each side of said diaphragm is equal, and a check valve disposed in said high pressure circuit between said high pressure inlet and outlet means preventing backflow of air from one side of said partitioned cavity whereby pressure breakdown on the other side of said partitioned cavity creates a pressure differential acting on said diaphragm to overcome said spring and urge said valve to closed position blocking flow of air through said low pressure circuit.

2. In an air suspension system of the type including a plurality of expansible springs, an air compressor, a high pressure network connecting said compressor with said springs, an exhaust network connecting said springs with said compressor, a plurality of leveling valves interposed in said networks and movable responsive to variation in expansion of said springs to selectively introduce or exhaust air from said springs, a pressure responsive device for blocking movement of air through said exhaust network to said compressor regardless of the position of said leveling valves, said device comprising a casing communicating with said high and low pressure networks, a slidable closure spring urged to a position allowing movement of air through said exhaust network, a diaphragm partition in said casing engaging said closure, means providing communication between said high pressure network and both sides of said casing, and a check valve disposed in said high pressure network so that pressure drop therein reduces the pressure on only one side of said diaphragm, the resultant pressure differential acting on said diaphragm to overcome said spring and move said valve to closed position preventing movement of air from said exhaust network to said compressor.

3. The structure set forth in claim 2 wherein said exhaust network includes a low pressure storage tank and said pressure responsive device is located between said tank and said compressor.

4. A fluid conditioning and control device for air suspension systems, said device comprising a body having a high pressure circuit including inlet means connected to a fluid pressure generating device and outlet means connected to a high pressure storage tank, a low pressure circuit including inlet and outlet means, a bowl portion connected to said body, means forming a cavity in said body above said bowl, a diaphragm disposed between said cavity and said bowl portion, means disposed between said bowl and said body adapted to direct flow of air from said high pressure inlet in a circular pattern effecting centrifugal separation of fluid contaminants, a reciprocable valve disposed in said body adapted to control flow of air from said low pressure inlet to said low pressure outlet, said valve having a foot portion engaging said diaphragm, spring means urging said valve to open position when the pressure on each side of said diaphragm is equal, a check valve disposed in said high pressure circuit preventing backflow of air from said bowl portion to said high pressure inlet whereby leakdown of pressure in said cavity produces a pressure differential on opposite sides of said diaphragm urging the latter in a direction overcoming said spring and moving said valve to closed position blocking flow of air from said low pressure inlet to said low pressure outlet.

5. A fluid conditioning and control device for air suspension systems, said device comprising a body having a high pressure circuit including inlet means communicating with a source of fluid pressure and outlet means communicating with a high pressure storage tank, a low pressure circuit including inlet and outlet means, a bowl portion connected to said body, means forming a cavity in said body above said bowl, a diaphragm disposed between said cavity and said bowl portion, means disposed between said bowl and said body adapted to direct flow of air from said high pressure inlet in a circular pattern effecting centrifugal separation of fluid contaminants, a reciprocable valve disposed in said body adapted to control flow of air from said low pressure inlet to said low pressure outlet, said valve having a foot portion engaging said diaphragm, spring means urging said valve to open position when the pressure on each side of said diaphragm is equal, a check valve disposed in said high pressure circuit at a point preventing backflow of air from said bowl portion to said high pressure inlet but allowing backflow thereto from said cavity whereby to effect a pressure differential on opposite sides of said diaphragm urging the latter in a direction overcoming said spring and moving said valve to closed position blocking flow of air from said low pressure inlet to said low pressure outlet.

6. In a device of the class described, an upper body portion and a lower body portion connected in abutting relation, said body portions having co-extensive cavities formed therein, a diaphragm disposed between said abutting portions and partitioning said cavity, a depending bowl portion connected to said lower body portion in fluid tight relation therewith, means forming a high pressure fluid circuit extending through said upper body portion and lower body portion and communicating with said bowl portion, a filter element recessed in said lower body portion, a fluid passage extending between said bowl portion and the cavity in said lower body portion, a fluid outlet port communicating with said cavity, a low pressure circuit extending through said upper body portion, a reciprocable valve structure mounted in said upper body portion, means biasing said valve to a normally open position allowing movement of fluid through said exhaust circuit, a foot portion on said valve abutting said diaphragm, means for admitting air into the cavity in said upper body portion from said high pressure circuit, a check valve in said lower body portion adapted to prevent reverse flow of fluid from said bowl portion, a pressure relief valve communicating with said low pressure circuit upstream of said reciprocable valve, and an atmosphere intake assembly communicating with said low pressure circuit downstream of said reciprocable valve.

7. The structure set forth in claim 4 including a plate structure disposed between said lower body portion and said bowl, said plate structure having a center portion engaging and maintaining said filter in said recess and an intermediate peripheral portion having circumferentially spaced openings adapted to impart swirling motion to fluid entering said bowl portion from said high pressure circuit.

8. The structure set forth in claim 7 wherein said openings are formed in circumferentially spaced depressed portions of said plate and occupy planes perpendicular to the major surface thereof.

References Cited in the file of this patent

UNITED STATES PATENTS

| | | |
|---|---|---|
| 207,485 | Blessing | Aug. 27, 1878 |
| 417,112 | Steininger | Dec. 10, 1889 |